US008326121B2

(12) United States Patent
Roberts et al.

(10) Patent No.: US 8,326,121 B2
(45) Date of Patent: Dec. 4, 2012

(54) COMMERICAL FREE STATUS FOR MEDIA CONTENT RECORDING SYSTEMS AND METHODS

(75) Inventors: Brian Roberts, Frisco, TX (US); Heath Stallings, Grapevine, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1557 days.

(21) Appl. No.: 11/769,857

(22) Filed: Jun. 28, 2007

(65) Prior Publication Data

US 2009/0007214 A1 Jan. 1, 2009

(51) Int. Cl.
*H04N 9/80* (2006.01)

(52) U.S. Cl. ........ 386/251; 386/248

(58) Field of Classification Search ........ 386/248, 386/249, 250, 251
See application file for complete search history.

(56) References Cited

U.S. PATENT DOCUMENTS

| 6,788,882 | B1 * | 9/2004 | Geer et al. ........ 386/243 |
| 7,225,142 | B1 * | 5/2007 | Apte et al. ........ 705/14.39 |
| 2003/0093790 | A1 * | 5/2003 | Logan et al. ........ 725/38 |
| 2004/0110522 | A1 * | 6/2004 | Howard et al. ........ 455/512 |

* cited by examiner

*Primary Examiner* — Thai Tran
*Assistant Examiner* — Nigar Chowdhury (57) ABSTRACT

An exemplary system includes a content processing subsystem configured to record at least a subset of a media content program, the media content program including at least one commercial segment. The content processing subsystem is further configured to provide a commercial free status indicator to an output device for presentation to a user when a sufficient sub-portion of the media content program has been recorded to enable commercial free playback of the media content program.

26 Claims, 7 Drawing Sheets

COMMERICAL FREE STATUS FOR MEDIA CONTENT RECORDING SYSTEMS AND METHODS

BACKGROUND INFORMATION

The set-top box ("STB") has become an important computing device for accessing media content services and the media content within those services. An STB or a separate device connected to the STB may be able to record broadcast media content, thereby allowing a user to experience recorded media content after the broadcast. By recording and then subsequently experiencing recorded content, a user is able to skip over undesirable segments included in the recorded media content (for example, advertising spots, public service announcements, news briefs, etc.). However, if the user initiates playback of recorded media content too soon in the recording process and then attempts to skip over undesirable segments, playback of the recorded content could catch up to the actual broadcast of the media content. At that point, the user would then experience broadcast media content instead of recorded media content and would be unable to skip over future undesirable segments.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical reference numbers designate identical or similar elements.

DETAILED DESCRIPTION OF EXEMPLARY IMPLEMENTATIONS

I. Introduction

Exemplary media content recording systems and methods and associated commercial free status indicators are disclosed herein. In certain implementations, a media content processing subsystem (e.g., a set-top box) may be configured to record at least a subset of a media content program, which may include at least one non-program content segment (e.g., an advertising time slot). The media content processing subsystem may be further configured to provide a commercial free status indicator to an output device for presentation to a user when a sufficient sub-portion of the media content program has been recorded to enable initiation of "commercial free" playback of the media content program. Accordingly, a user is able to know the point at which he or she can initiate playback and expect to experience the media content program in its entirety without pause and without having to experience undesirable content included in the media content program. When playback is initiated after presentation of the commercial free status indicator, the user is able to skip over undesirable content included in non-program content segments of the media content program.

Components and functions of exemplary implementations of media content recording systems and methods and associated commercial free status indicators will now be described in more detail.

II. Exemplary System View

Figure 1:
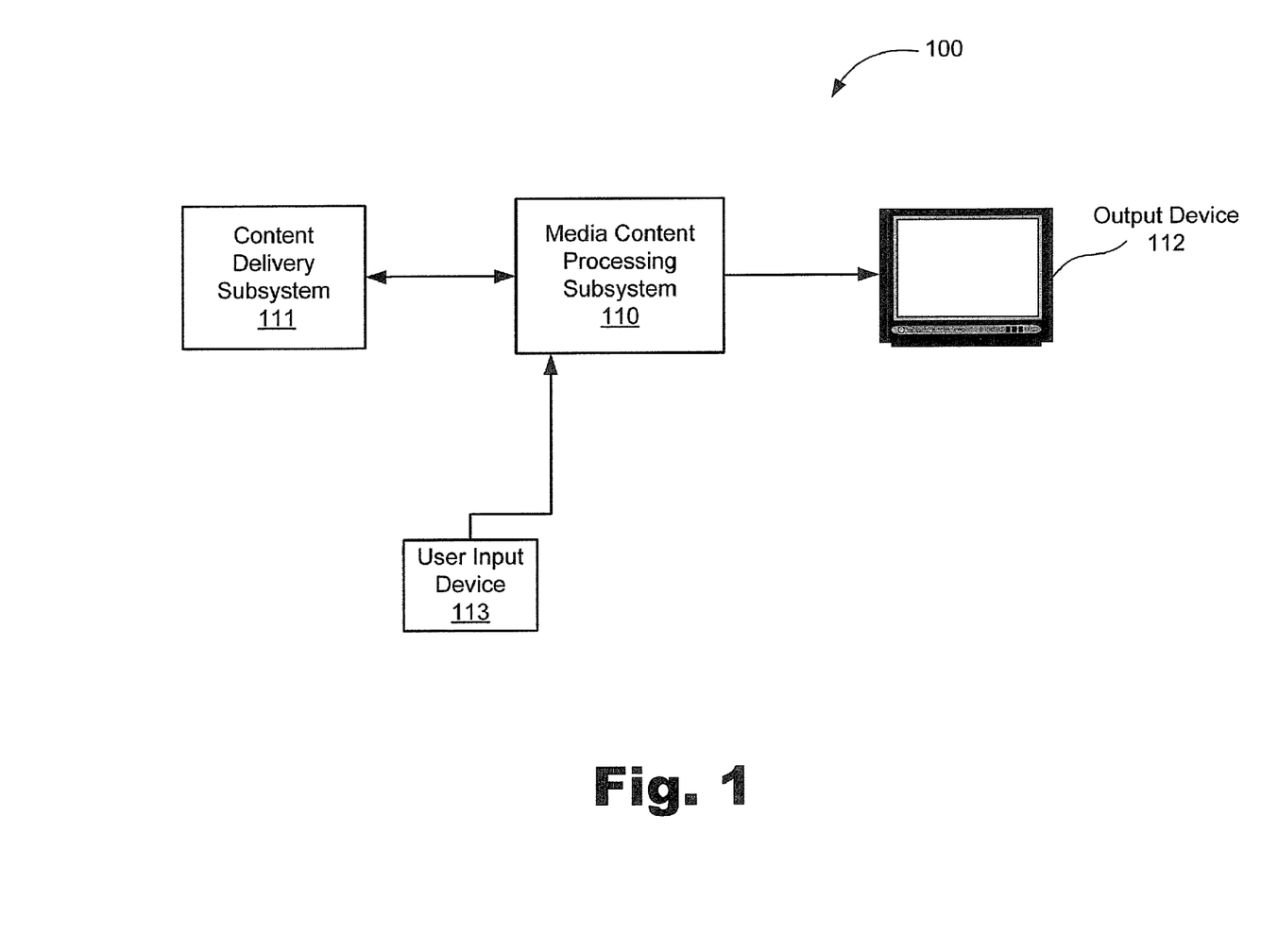
FIG. 1 illustrates an example of a media content access system.

FIG. 1 illustrates an example of a media content access system 100 (or simply the "system 100"). As shown in FIG. 1, the system 100 may include a media content processing subsystem 110 configured to communicate with and receive a signal or data stream containing data representative of media content and/or other content (e.g., media content metadata and/or program guide data) from of a content delivery subsystem 111. The media content processing subsystem 110 may be configured to process a media content stream provided by the content delivery subsystem 111, including recording and/or providing a media content program, or one or more components (e.g., video and/or audio components) of a media content program, to an output device 112 (e.g., a television, computer monitor, etc.) for presentation (e.g., display and/or audio broadcast) to a user. The media content processing subsystem 110 may be controlled by a user input device 113 (e.g., a remote control device).

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Content Delivery Subsystem

The content delivery subsystem 111 may include any device or devices (e.g., a content server) configured for receiving, storing, processing, or providing media content. The content delivery subsystem 111 may be configured to communicate with the media content processing subsystem 110 via one or more types of communications networks (and communications links thereto), including, but not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network and/or a TiVo® network), an optical fiber network, a local area network, any other suitable network, and any combination of these networks. In some alternative examples, the media content processing subsystem 110 may be connected directly to the content delivery subsystem 111.

The media content processing subsystem 110 and content delivery subsystem 111 may communicate using any known communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), User Datagram Protocol ("UDP"), socket connections, Ethernet, and other suitable communications technologies. Devices included in the content delivery subsystem 111 may communicate with one another using any of the communication technologies and/or networks listed herein.

Content delivery subsystem 111 may be configured to provide various types of media content, media content metadata, program guide data, and/or other content or data to the media content processing subsystem 110 using any suitable communication technologies, including any of those described herein. The media content may include one or more media content programs, or one or more segments of the media content program(s). The term "media content program" as used herein refers generally to any television program, on demand program, pay-per-view program, broadcast media program, IPTV content, video, movie, song, audio, or any segment, component, or combination of these or other forms of media content that may be viewed or otherwise experienced by a user.

A media content program may include program content and non-program content such as advertisements, promotional spots, public service announcements and news briefs (referred to herein collectively as "commercials" or "commercial content"). For example, one or more non-program content segments (e.g., advertising time slots) are typically included in a media content program. Non-program content (i.e., commercial content) may be included in or inserted into the segments. The segments are usually positioned at various times within a media content program. Accordingly, as used herein, the term "commercial segment" may refer to a segment in a media content program that is configured to include any type of non-program content. The term "commercial" or "commercial content" may refer to any type of non-program content. An exemplary representation of a media content program and its components will be described further below in relation to FIG. 4.

B. Output Device

As mentioned, the media content processing subsystem 110 may be coupled to an output device 112 configured to present content, including media content and/or program guide data, to a user. The output device 112 may display, play, or otherwise present the content for experiencing by the user. The output device 112 may include, but is not limited to, a television, computer monitor, mobile phone, handheld device, display screen, or any other device configured to present content to a user.

The output device 112 may be configured to display graphical user interfaces. Accordingly, media content, program guide data, and any other content, information, or indicators (e.g., a commercial free status indicator) may be displayed in a graphical user interface.

C. Media Content Processing Subsystem

Figure 2:
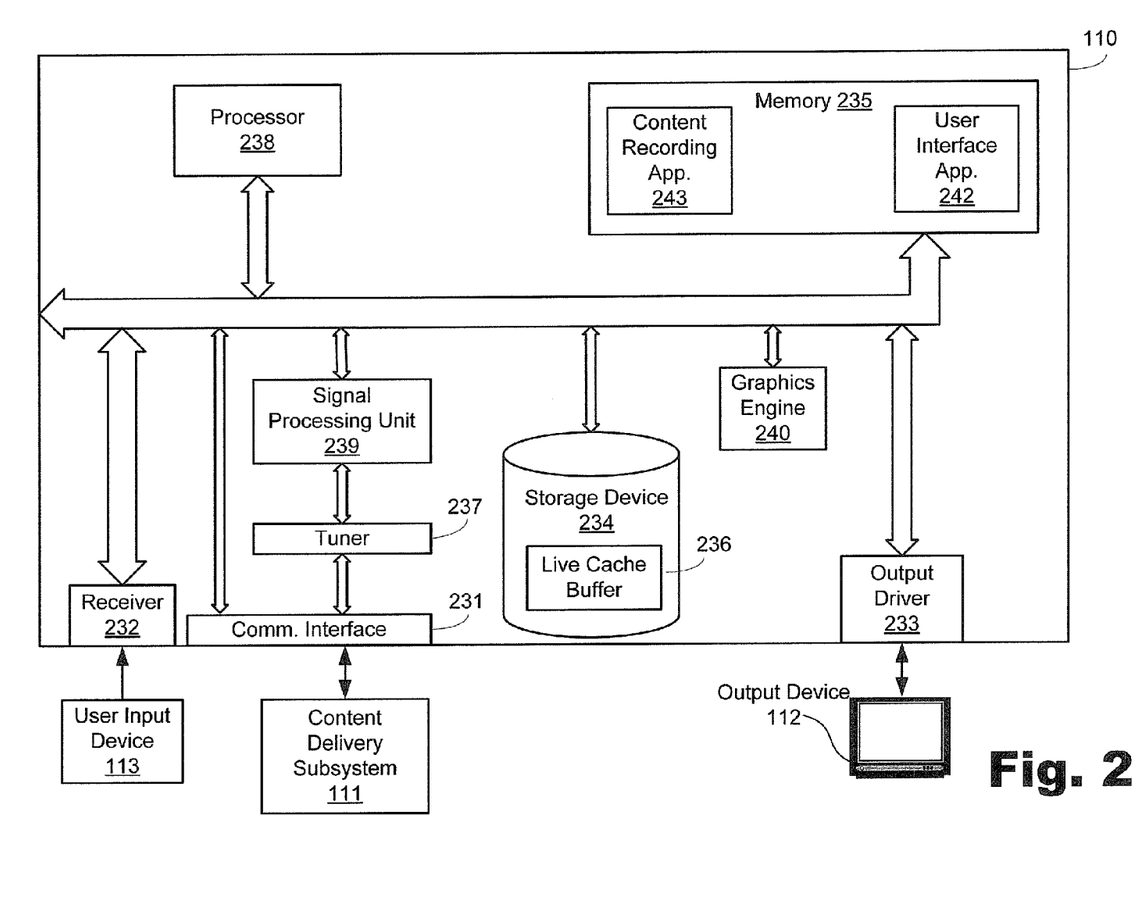
FIG. 2 illustrates an exemplary media content processing subsystem.

FIG. 2 is a block diagram of an exemplary media content processing subsystem 110 (or simply "processing subsystem 110"). The processing subsystem 110 may include any combination of hardware, software, and firmware configured to process media content and/or other content or data for presentation to a user. As used herein and in the appended claims, unless otherwise specifically denoted, the terms "media content processing subsystem" and "processing subsystem" will be used to refer expansively to all possible receivers that receive and process (e.g., record) digital and/or analog media content. An exemplary processing subsystem 110 may include, but is not limited to, a set-top box ("STB"), home communication terminal ("HCT"), digital home communication terminal ("DHCT"), personal video recorder ("PVR") (e.g., a digital video recorder ("DVR")), DVD player, handheld entertainment device, video-enabled phone (e.g., a mobile phone), and personal computer.

In certain implementations, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 3:
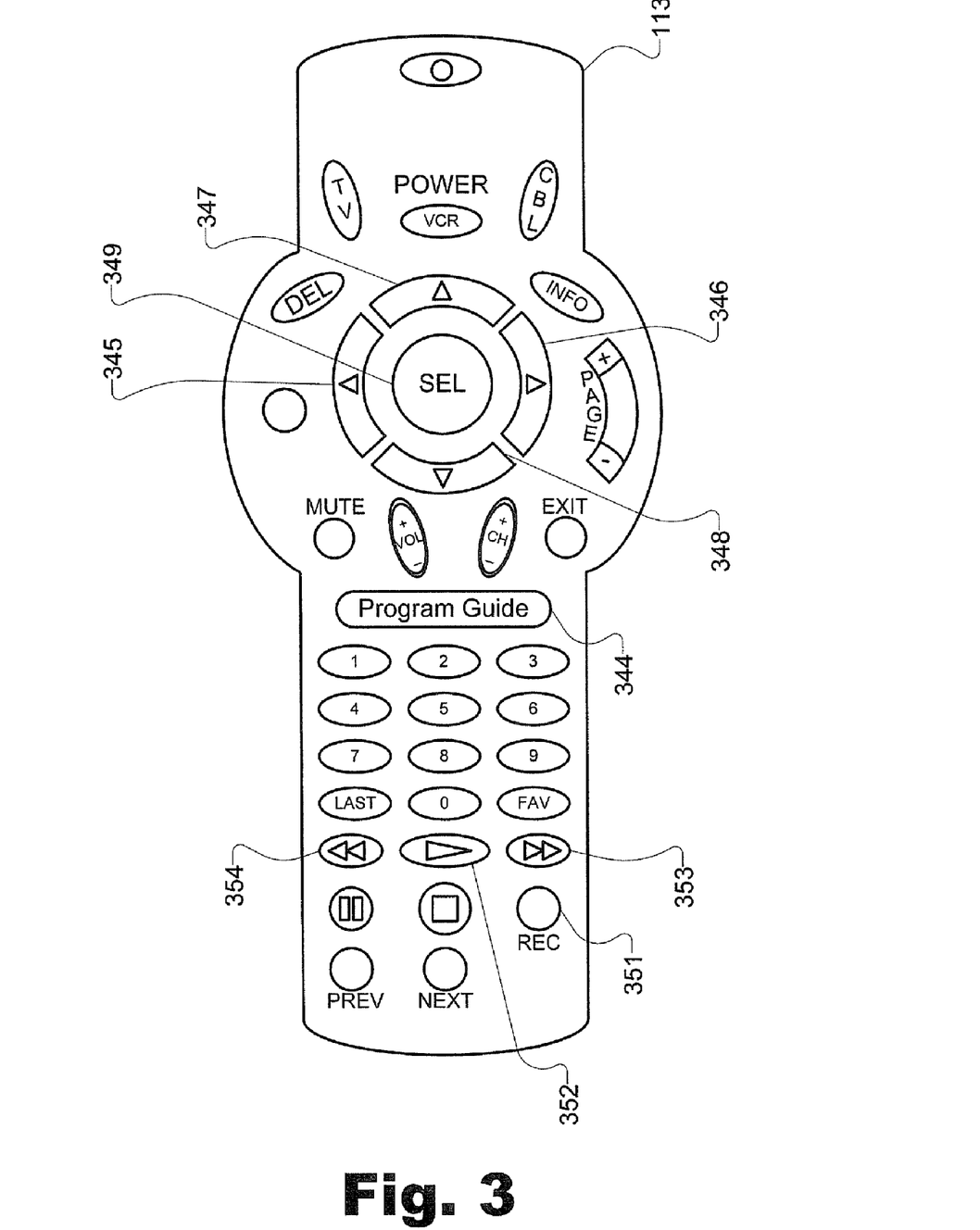
FIG. 3 illustrates an exemplary remote control user input device.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 2, the processing subsystem 110 may include a communication interface 231 configured to receive content (e.g., media content) and/or data (e.g., media content metadata) in any acceptable format from the content delivery subsystem 111 or from any other suitable media content source(s). For example, the media content may be received in real time, broadcast format. The communication interface 231 may include any device, logic, and/or other technologies suitable for receiving signals and/or data representative of media content and/or other types of content or data. The communication interface 231 may be configured to interface with any suitable communication media, protocols, and formats, including any of those mentioned above.

In certain implementations, the communication interface 231 may include a single port configured to receive content and/or data from the content delivery subsystem 111 and/or from any other source. For example, the communication interface 231 may include or be connected to a broadband connection, which can enable the processing subsystem 110 to receive content from one or more sources on a single port. In other implementations, multiple ports may be used.

The processing subsystem 110 may also include a receiver 232 configured to receive user input signals (e.g., content recording and/or playback commands) from a user input device 113. The user input device 113 may include, for example, a remote control device or any other suitable input device and may be configured to communicate with the receiver 232 via a wireless link, electrical connection, or any other suitable communication link.

An exemplary remote control user input device 113 is illustrated in FIG. 3. In some examples, the input device 113 may be configured to enable a user to control viewing options for experiencing media content, recording media content, and/or considering program guide data provided by the processing subsystem 110. A program guide button 344 may be configured to evoke the display of a program guide GUI on the output device 112. A left button 345, right button 346, up button 347, down button 348, and select button 349 may be included and configured to enable the user to evoke and/or navigate through various views, options, and graphical user interfaces displayed by the output device 112.

The input device 113 may include a record button 351 for starting and stopping the recording of media content, a playback button 352 for initiating playback of media content, and fast-forward 353 and rewind 354 buttons for controlling trick play modes, including skipping forward or backward through a media content program. For example, a user may utilize the fast forward button 354 (or other control mechanism) to skip over advertising content included in recorded media content during playback of the recorded content. In other implementations, playback of recorded media content may be configured to automatically skip over advertising time slots included in the recorded media content. It will be recognized that the input device 113 shown in FIG. 3 is merely illustrative of the many different types of user input devices that may be used in connection with the present systems and methods.

Returning to FIG. 2, the processing subsystem 110 may also include an output driver 233 configured to interface with or drive the output device 112. As instructed by one or more processors of the processing subsystem 110, the output driver 233 may provide output signals to the output device 112, the output signals including content (e.g., media content and/or graphical user interface content) to be presented by the output device 112 for experiencing by a user. For example, the output driver 233 may provide a program guide GUI to the output device 112 for presentation to the user. The output driver 233 may include any combination of hardware, software, and firmware as may serve a particular application.

2. Storage Devices

Storage device 234 may include one or more data storage media, devices, or configurations and may employ any type, form, and combination of storage media. For example, the storage device 234 may include, but is not limited to, a hard drive, network drive, flash drive, magnetic disc, optical disc, or other non-volatile storage unit. Media content, media content metadata, program guide data, and other content or data may be temporarily and/or permanently stored in the storage device 234. For example, recorded media content may be stored in the storage device 234.

The storage device 234 of FIG. 2 is shown to be a part of the processing subsystem 110 for illustrative purposes only. It will be understood that the storage device 234 may additionally or alternatively be located external to the processing subsystem 110.

The processing subsystem may also include memory 235. Memory 235 may include, but is not limited to, FLASH memory, random access memory ("RAM"), dynamic RAM ("DRAM"), or a combination thereof. In some examples, as will be described in more detail below, various applications used by the processing subsystem 110 may reside in memory 235.

As shown in FIG. 2, the storage device 234 may include one or more live cache buffers 236. The live cache buffer 236 may additionally or alternatively reside in memory 235 or in a storage device external to the processing subsystem 110. In some examples, media content may be temporarily stored in the live cache buffer 236 to facilitate viewing, playback, or recording of the content.

3. Tuner

Tuner 237 may be configured to selectively receive content (e.g., media content) carried on a particular content channel. For example, tuner 237 may be tuned to a particular content channel such that the content carried on the content channel is received and can be processed by the processing subsystem 110.

In some examples, the processing subsystem 110 may include multiple tuners 237 such that content carried on different content channels may be concurrently received by the processing subsystem 110. For example, the processing subsystem 110 may include a first tuner configured to receive content carried on an analog video signal and a second tuner configured to simultaneously receive content carried on a digital compressed signal.

In some examples, media content received at the tuner 237 is temporarily buffered, or stored, in the live cache buffer 236. If there are multiple tuners 237, there may be a live cache buffer 236 corresponding to each of the tuners 237.

While tuner 237 may be used to receive various types of content-carrying signals broadcast by content delivery subsystem 111, processing subsystem 110 may be configured to receive other types of content signals (including media content signals, metadata, and/or program guide data signals) from the content delivery subsystem 111 without using a tuner. For example, content delivery subsystem 111 may broadcast digital streams of data packets (e.g., Internet Protocol ("IP") based data packets) that can be received without using a tuner. For such types of content signals, the communication interface 231 may receive and forward the signals directly to other components of the processing subsystem 110 (e.g., the processor 238 or signal processing unit 239) without going through the tuner 237. For an IP-based signal, for example, the signal processing unit 239 may function as an IP receiver.

4. Processors

As shown in FIG. 2, the processing subsystem 110 may include one or more processors, such as processor 238 configured to control the operations of the processing subsystem 110. The processing subsystem 110 may also include a signal processing unit 239 configured to process incoming media content. The signal processing unit 239 may be configured, for example, to demodulate and parse encoded digital media content. In some examples, the processing subsystem 110 may include one or more signal processing units 239 corresponding to each of the tuners 237. Media content and other content or data received from the content delivery subsystem 111 may be processed by the signal processing unit 239, the processor 238, and/or any other suitable component(s) of the processing subsystem 110.

The processing subsystem 110 may also include a graphics engine 240 configured to generate graphics that can be displayed by the output device 112. The graphics may include graphical user interfaces such as, but not limited to, one or more media presentation interfaces, one or more program guide graphical user interfaces including views of at least portions of program guides (e.g., views of different portions of the program guides), and any other suitable user interface. A graphical user interface may include tools for controlling the recording of content, content recording information (recording status indicators such as progress indicators), commercial free status indicators, tools for controlling the playback of media content, and other graphics.

5. Application Clients

One or more applications residing within the processing subsystem 110 may be executed upon initiation by a user of the processing subsystem 110, or upon the occurrence of another predetermined event. The applications, or application clients, may reside in memory 235 or in any other area of the processing subsystem 110 and be executed by the processor 238.

As shown in FIG. 2, the processing subsystem 110 may include a user interface application 242 and a content recording application 243 residing in memory 235. The content recording application 243 may be configured to control recording of content, including media content that may be received from the content delivery subsystem 111 as described above.

In certain implementations, for example, content delivery subsystem 111 may provide a real time broadcast transmission of a media content program. The content processing subsystem 110 may receive the transmitted program, which may be provided in real time (or at least near real time) to the output device 112 for presentation to a user. In such a presentation of transmitted media content, a user is unable to skip over commercials included in the media content program. However, the content processing subsystem 110 may be configured to record the received transmitted media content program for subsequent playback. Unlike real time playback of transmitted media content, playback of previously recorded media content allows the user to skip over commercials.

The content recording application 243 may be configured to determine at what point during the recording of a media content program a user becomes able to initiate playback of the recorded media content program and be able to seamlessly experience the entire program "commercial free." That is, a sufficient sub-portion (i.e., a sufficient duration) of the media content program has been recorded to enable seamless, commercial free playback of the media content program (i.e., without pause and allowing for skipping over all commercial segments included in the media content program). This point in the recording process may be referred to as the "commercial free point."

Figure 4:
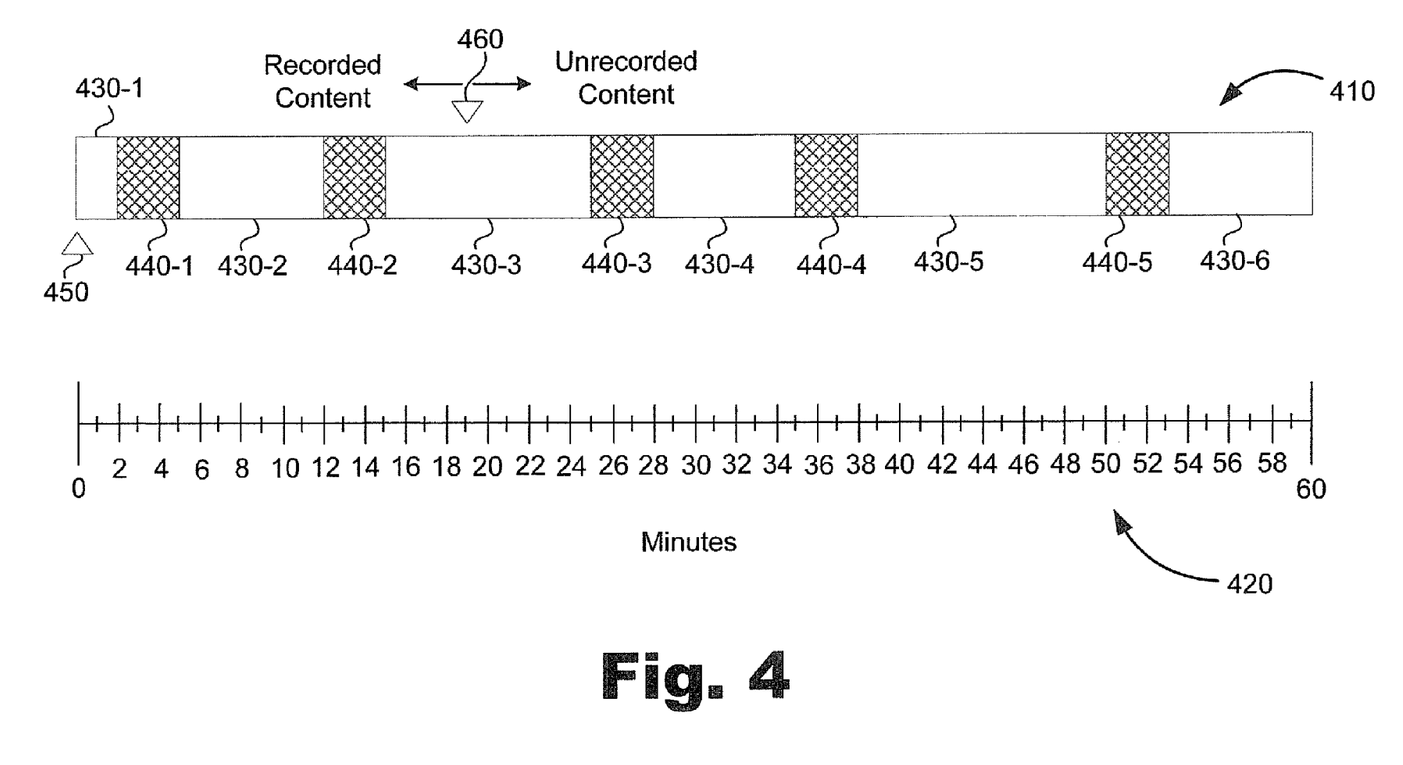
FIG. 4 illustrates an exemplary representation of a media content program.

To facilitate an understanding of the commercial free point and how it may be determined, FIG. 4 illustrates an exemplary representation of a media content program 410 with reference to a time bar 420. The exemplary media content program 410 has a total duration time of sixty ("60") minutes as indicated by the time bar 420. The media content program 410 may include program content, which is represented by program content segments 430-1 through 430-6 (collectively "the program content segments 430") in FIG. 4, and non-program content, which is represented by commercial segments 440-1 through 440-5 (collectively "the commercial segments 440") in FIG. 4. The commercial segments 440 may be representative of time slots that include commercial content or that have been reserved for insertion of commercial content.

Metadata associated with the media content program 410 may include information descriptive of attributes of the media content program 410. For example, the metadata may include information such as, but not limited to, start time, end time, total duration, and position markers (e.g., position markers for advertising content slots). The content processing subsystem 110 may use any of the metadata for generating and providing status indicators, including recording status indicators, playback status indicators, and commercial free status indicators. For example, metadata may be used to determine when a recording process reaches a commercial free point and/or when to provide a commercial free status indicator for presentation to a user.

The content processing subsystem 110 may be configured to utilize a predefined heuristic for determining a commercial free point for a media content program. In certain implementations, a commercial free point may be determined based on the durations of any non-program content time slots included in a media content program (e.g., the durations of the commercial segments 440 included in media content program 410). For example, the predefined heuristic may be configured to instruct the content processing subsystem 110 (e.g., the processor 238) to sum the durations of the commercial segments 440 included in media content program 410. The sum may then be used to set the commercial free point for the media content program 410. In a particular implementation, the commercial free point is set equal, or at least approximately equal, to the sum.

For the media content program 410 of FIG. 4, the sum of the durations of the commercial segments 440 is fifteen ("15") minutes. Accordingly, the commercial free point may be set to the point of the recording process at which the first fifteen ("15") minutes of the media content program 410 have been recorded. At this point, a user of the content processing subsystem 110 is able to initiate playback of the recorded content and be able to experience the media content program 410 in its entirety without pause and without experiencing the non-program content included in the commercial segments 440 (by skipping over the commercial segments 440 during playback).

If the user initiates playback on or after the commercial free point (in this example, when fifteen ("15") minutes of the media content program 410 have been recorded), seamless, commercial free playback of the media content program 410 will not catch up to the recording of the media content program 410 until after the end of the last commercial segment 440-5 included in the media content program 410.

To illustrate the progress of and relationship between the recording and playback of the media content program 410, the positions of a playback status indicator 450 and a recording status indicator 460 may be considered over time. The playback status indicator 450 may be configured to identify the current playback point in a playback process, and the recording status indicator 460 may be configured to identify the current recording point in a recording process.

A user may initiate playback of the media content program 410 when the recording status indicator 450 is at the commercial free point. At this point, the playback status indicator 450 will be at minute zero ("0") and the recording status indicator 460 will be at minute fifteen ("15") of the media content program 410. Progress of both the recording and the playback processes may then proceed in real time. However, the playback process may skip over the commercial segments 440. Accordingly, when the recording status indicator 460 reaches minute seventeen ("17"), the playback status indicator 450 will be at minute five ("5") of the media content program 410, assuming the advertising content in the three ("3") minute long commercial segment 440-1 is skipped over with little or no delay. Similarly, when the recording status indicator 460 reaches minute twenty four ("24"), the playback status indicator 450 may be at minute fifteen ("15") of the media content program 410. When the recording status indicator 460 reaches minute thirty four ("34"), the playback status indicator 450 may be at minute twenty eight ("28") of the media content program 410. When the recording status indicator 460 reaches minute forty one ("41"), the playback status indicator 450 may be at minute thirty eight ("38") of the media content program 410. When the recording status indicator 460 reaches minute fifty three ("53"), the playback status indicator 450 may also be at minute fifty three ("53") of the media content program 410.

At this point, playback has caught up with the recording of the media content program 410. However, the catch-up point occurs no earlier than once the non-program content of all of the commercial segments 440 has been recorded. Accordingly, playback is able to skip over all of the commercial segments 440 included in the media content program 410. Playback of the last seven ("7") minutes of program content in the media content program 410 can be experienced without commercials and without pause during the real time transmission of the program 410.

Alternatively, the last seven minutes of the media content program 410 may be recorded and then subsequently played back during the commercial free playback. For example, if any delays are introduced into the playback process (e.g., delays associated with skipping over the commercial segments 440), playback will lag behind recording, even at minute fifty three ("53") and on through to the end of the media content program 410. In other words, the playback will not catch up to the actual transmission of the media content program 410, and the user will experience the entire media content program 410 in recorded form with at least some delay after the actual transmission of the media content program 410. This may be beneficial in certain implementations. For example, during playback of the media content program 410, the content processing subsystem 110 can avoid transitioning from playing back recorded content to playing back real-time transmitted content. This can help avoid any interruption that may be caused by such a transition.

In certain embodiments, the content processing subsystem 110 may be configured to intentionally factor a predetermined delay into a determination of a commercial free point for a media content program 410. The delay may be designed to ensure that commercial free playback of the media content program 410 will not include a transition from recorded content to real-time transmitted content at an inopportune time.

For example, a predetermined delay ("D") may be added to the sum duration of the commercial segments 440 and the new sum used to set the commercial free point. For instance, the delay ("D") may be given a value of one ("1") minute, and the commercial free point for the media content program 410 may be set to sixteen ("16") minutes. Accordingly, playback will always be at least one ("1") minute behind the recording of the media content program 410, thereby avoiding a transition from playback of recorded content to a playback of real-time transmitted content. Of course, any suitable value may be used for the delay ("D").

The above-described exemplary heuristic for determining a commercial free point is illustrative only. Other heuristics may be used in other implementations. For example, the above-described heuristic may be especially beneficial in implementations in which the content recording application 243 has access to metadata from which the durations of commercial segments are known or may be derived. However, in certain implementations, such data may not be readily available and other heuristics may be used to determine (e.g., estimate) a commercial free point for a media content instance. Merely by way of an example, for a media content program such as media content program 410, the content processing subsystem 110 may be configured to set a commercial free point based on the total duration of the program. For instance, the commercial free point may be set to approximately one quarter of the total duration, which, for many typical media content programs, should provide more than sufficient recording time duration to enable seamless, commercial free playback. As another example, where the amount of program content present in a transmitted media content program is known (e.g., from metadata associated with the program), the determination may be made by calculating a difference from the media content program duration and the duration of the program content included in the media content program. As yet another example, a user may be able to pre-program durations of program content (or non-program content) for specific media content programs or types of media content programs (e.g., specifying that a sixty-minute commercial television broadcast typically includes forty eight ("48") minutes of program content, specifying that a baseball broadcast includes at least fifty one ("51") minutes of commercial segments due to inning changes, etc.).

In some embodiments, metadata associated with a media content program may not be provided to a content processing subsystem 110, but rather may be provided in connection with program guide information associated with the media content program. In such cases, the content recording application 243 may access such program guide information to obtain parameters for determining a commercial free point.

In some embodiments, the determination of the commercial free point is performed continuously, based on the start of recording relative to the start of a media content program being recorded. For example, should a user decide to begin recording at some point during the realtime transmission of the media content program, it may be that some commercial segments have already passed. The determination of the commercial free point may take into account the reduction in remaining commercial segments in the portion of the media content program being recorded. Referring back to the example in FIG. 4, should a user choose to begin recording of media content program 410 after eight ("8") minutes have already elapsed, the first commercial segment 440-1 would not be used in the determination of the commercial free point (as it has already passed), and thus the commercial free point would be (as calculated using the exemplary method described above), twelve minutes.

In certain examples, the commercial free point may be determined based on commercial segments included in a media content program without regard to the type of commercial content associated with the segments. In other examples, the commercial free point may be determined based on one or more particular types of non-program content associated with the commercial segments. For example, commercial segments including advertising content may be used to determine a commercial free point while commercial segments including public service announcements are not factored into the determination. Accordingly, the content processing subsystem 110 may be configured to use a select subset of commercial segments in a media content program to determine the commercial free point.

The content processing subsystem 110 may be configured to notify a user when a recording has reached a commercial free point. Any suitable indicator may be used, including, but not limited to, a visual indicator (e.g., a color change, shade change, textual message, pop-up message), audio indicator (e.g., playback of an audio message), haptic indicator, or any combination thereof. An indicator of a commercial free point may be referred to as a "commercial free status indicator." Presentation of a commercial free status indicator enables a user to know the substantially earliest point in a recording process that seamless, commercial free playback of the recorded content can be initiated. Accordingly, the user can easily avoid premature initiation of playback, which can lead to undesired interruption of the playback.

In certain implementations, the content processing subsystem 110 may be configured to provide a commercial free status indicator in a graphical user interface. The graphical user interface may be provided to the output device 112 for presentation to a user. The commercial free status indicator may be included in any type of graphical user interface, including graphical user interfaces presenting media content, program guide content, and/or recording progress information, for example.

Figure 5:
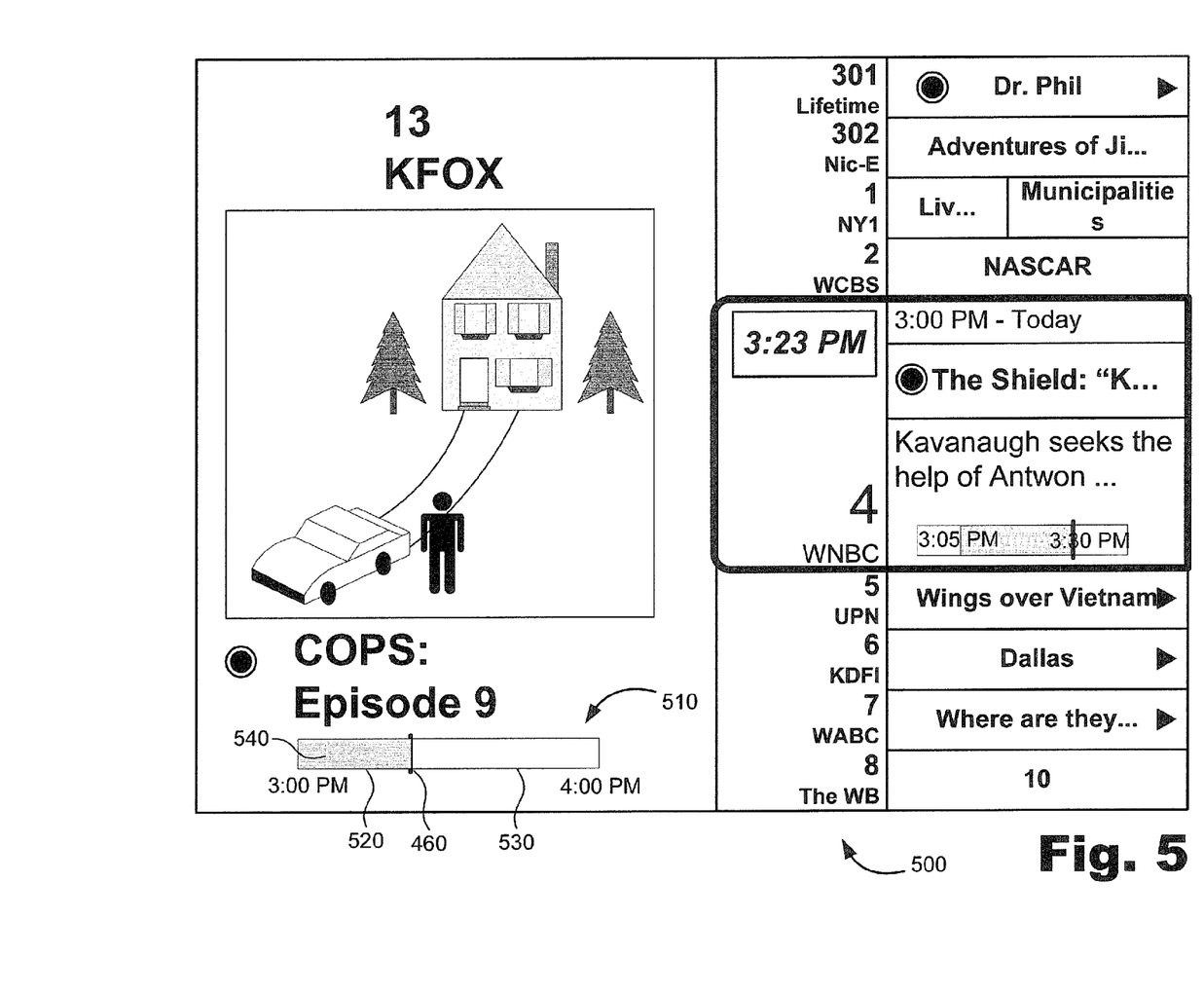
FIG. 5 illustrates an exemplary graphical user interface that may be presented by an output device.
Figure 6:
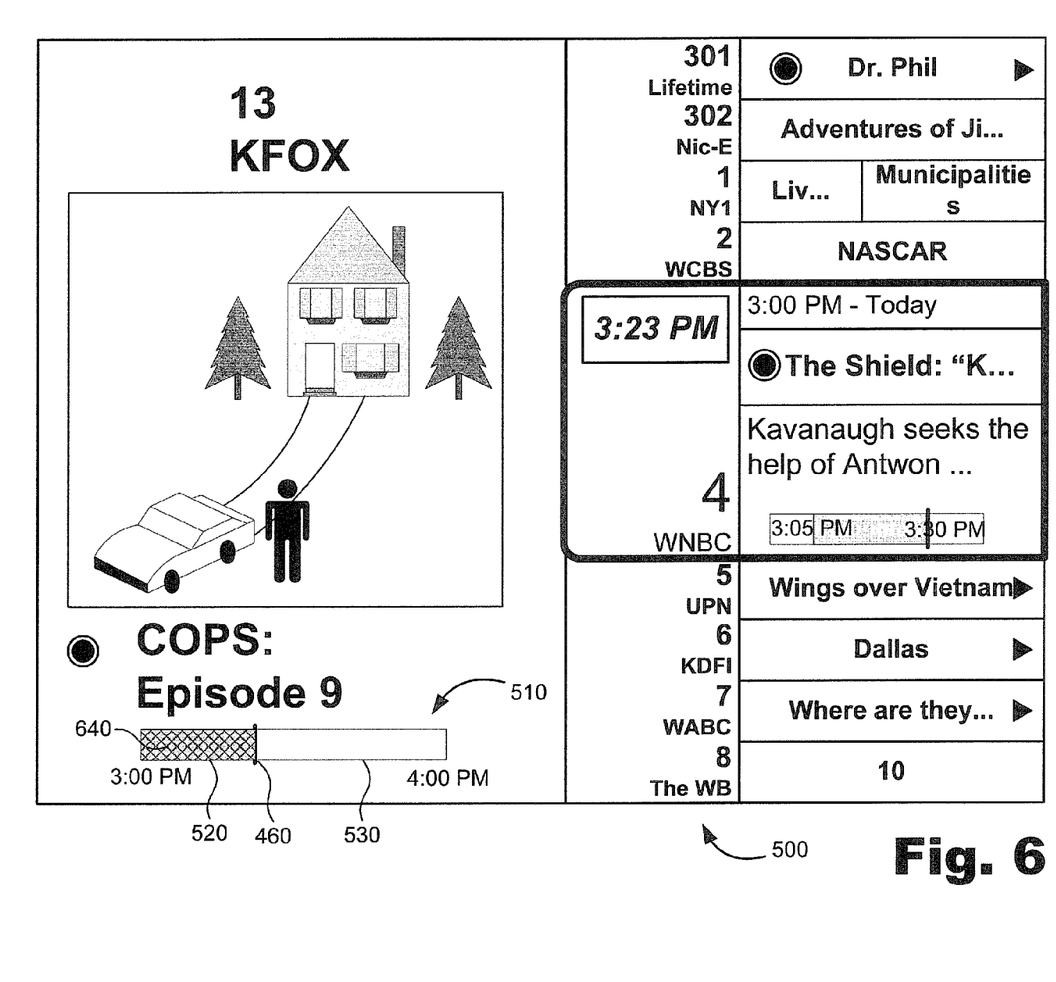
FIG. 6 illustrates another version of the exemplary graphical user interface of FIG. 5, the graphical user interface including a commercial free status indicator.

FIGS. 5 and 6 illustrate an exemplary graphical user interface 500 in which a commercial free status indicator that may be presented. As shown in FIG. 5, the graphical user interface 500 may include a recording progress indicator 510 configured to indicate the status of a recording process. The recording status indicator 460 indicates the current position of the recording process in relation to the media content program being recorded. Section 520 represents recorded content and section 530 represents unrecorded content included in the media content program. Section 520 may include a first attribute 540 (e.g., shade, color, pattern, etc.) configured to distinguish from section 530. For example, the first attribute 540 may be a particular color, such as red, indicative of recorded content.

When the commercial free point is reached in the recording process, a commercial free status indicator may be presented in the graphical user interface 500. FIG. 6 illustrates an exemplary commercial free status indicator 640 in the form of changing the first attribute 540 of FIG. 5 to a second attribute. For example, the color or shade in FIG. 5 may be changed to another color or shade. For instance, where the first attribute 540 may be a color red in FIG. 5, the commercial free status indicator 640 may include a change in color (e.g., from red to green). Alternatively or additionally, other indicators may be used in other implementations. For example, a pop-up window may be displayed in the graphical user interface 500, the window including an explanation of the meaning of a commercial free status indicator. As another example, a numeric value may be displayed, indicating the amount of time until the commercial free point will be reached. As a still further example, an icon may be displayed, the meaning of which indicates to a user that the commercial free point has been reached. A combination of two or more of these indicators may be used.

In some examples, the content processing subsystem 110 may be configured to automatically initiate commercial free playback of a media content program substantially when or after the recording process reaches the commercial free point. This feature may be configurable by a user of the content processing subsystem 110 such that he or she may control whether commercial free playback is automatically initiated or left to manual user initiation.

III. Exemplary Process View

Figure 7:
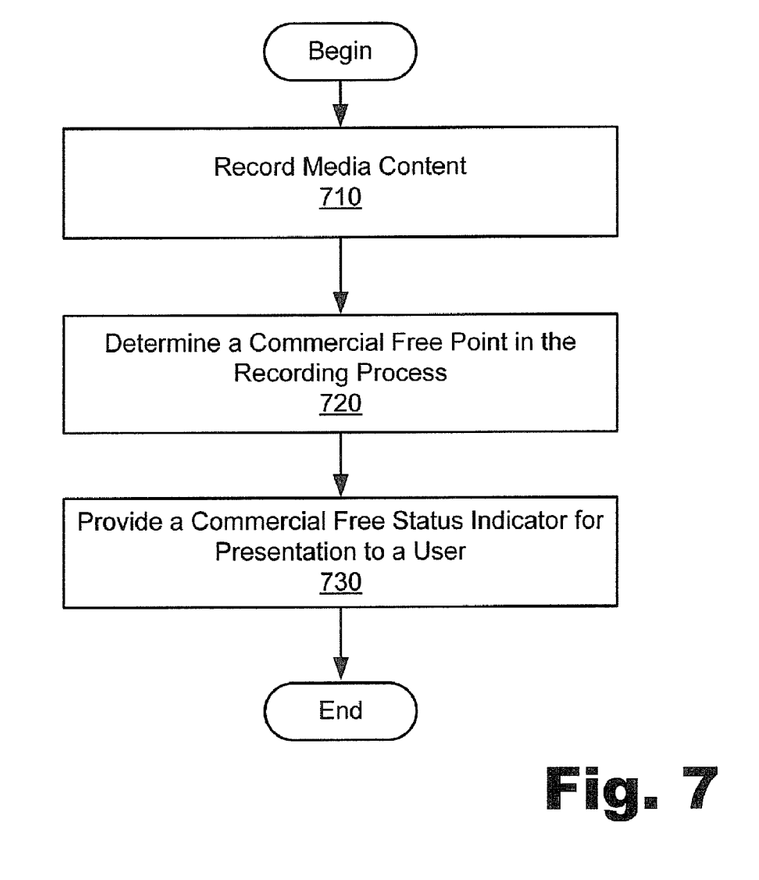
FIG. 7 illustrates an exemplary method of recording media content.

FIG. 7 illustrates an exemplary method of recording media content. While FIG. 7 illustrates exemplary steps according to one implementation, other implementations may omit, add to, reorder, and/or modify any of the steps shown in FIG. 7.

In step 710, media content is recorded. Step 710 may be performed in any of the ways described above, including the content recording application 243 instructing the content processing subsystem 110 to record at least a subset of a media content program being received from the content delivery subsystem 111.

In step 720, a commercial free point is determined. Step 720 may be performed in any of the ways described above, including the content recording application 243 instructing the content processing subsystem 110 to determine a commercial free point for a media content program based on the total time duration of commercial segments included in the media content program or on a total duration of at least a subset the media content program.

In step 730, a commercial free status indicator is provided for presentation to a user. Step 730 may be performed in any of the ways described above, including providing data representative of the commercial free status indicator to the output device 112. The commercial free status indicator may be provided when the recording process in step 710 reaches the commercial free point, or a predetermined delay after the recording process reaches the commercial free point.

IV. Alternative Implementations

The preceding description has been presented only to illustrate and describe exemplary implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A method comprising:
   recording at least a subset of a media content program, the media content program including at least one commercial segment;
   while recording the media content program, automatically determining that a sufficient sub-portion of the media content program has been recorded to enable initiation of commercial free playback of the media content program;
   in response to the determining that the sufficient sub-portion of the media content program has been recorded, providing a commercial free status indicator for presentation to a user to indicate that the commercial free playback is available to the user.

2. The method of claim 1, wherein said determining step includes determining a commercial free point for the media content program based on the at least one commercial segment, the commercial free point being representative of the sufficient sub-portion of the media content program.

3. The method of claim 2, wherein said determining step further includes summing at least one duration corresponding with the at least one commercial segment.

4. The method of claim 3, wherein said determining step further includes setting the commercial free point equal to the sum of the at least one duration.

5. The method of claim 3, wherein said determining step further includes setting the commercial free point equal to the sum of the at least one duration plus a predetermined delay.

6. The method of claim 2, further comprising initiating the commercial free playback of the media content program substantially when or after said recording reaches the commercial free point.

7. The method of claim 6, further comprising playing back the media content program without pause and skipping over each of the at least one commercial segment included in the media content program.

8. The method of claim 1, further comprising providing a recording progress indicator for presentation to the user, said step of providing the commercial free status indicator including changing a visual attribute of the recording progress indicator.

9. The method of claim 8, wherein said changing step includes changing a first shade or color to a second shade or color.

10. The method of claim 1, wherein said determining step includes determining a commercial free point for the media content program based on a total duration of at least a subset of the media content program, the commercial free point being representative of the sufficient sub-portion of the media content program.

11. The method of claim 1, wherein said determining step includes determining a commercial free point for the media content program based on a calculated difference between a media content program duration and a duration of program content included in the media content program.

12. The method of claim 1, wherein said determining step includes determining a commercial free point for the media content program based on a pre-programmed duration.

13. A system comprising:
a content processing subsystem configured to
record at least a subset of a media content program, the media content program including at least one commercial segment,
automatically determine, while recording the media content program, that a sufficient sub-portion of the media content program has been recorded to enable initiation of commercial free playback of the media content program, and
provide, in response to the determining that the sufficient sub-portion of the media content program has been recorded, a commercial free status indicator to an output device for presentation to a user to indicate that the commercial free playback is available to the user.

14. The system of claim 13, wherein said content processing subsystem is configured to determine a commercial free point for the media content program based on the at least one commercial segment, the commercial free point being representative of the sufficient sub-portion of the media content program.

15. The system of claim 14, wherein said content processing subsystem is configured to determine the commercial free point by summing at least one duration corresponding with the at least one commercial segment and setting the commercial free point equal to the sum of the at least one duration.

16. The system of claim 14, wherein said content processing subsystem is configured to determine the commercial free point by summing at least one duration corresponding with the at least one commercial segment and setting the commercial free point equal to the sum of the at least one duration plus a predetermined delay.

17. The system of claim 14, wherein when the commercial free playback is initiated no earlier than the commercial free point, said content processing subsystem is configured to play back the media content program without pause and skipping over each of the at least one commercial segment included in the media content program.

18. The system of claim 13, wherein said content processing subsystem is configured to provide a recording progress indicator to the output device for presentation to the user, said commercial free status indicator being configured to cause a change to a visual attribute of the recording progress indicator.

19. The system of claim 18, wherein said change includes a transition from a first shade or color to a second shade or color.

20. The system of claim 13, wherein said content processing subsystem is configured to record the media content program in real time.

21. The system of claim 13, further comprising a content delivery subsystem configured to transmit the media content program, said content processing subsystem being configured to receive the media content program from said content delivery subsystem in real time.

22. The system of claim 13, wherein said content processing subsystem is configured to determine a commercial free point for the media content program based on a total duration of at least a subset of the media content program, the commercial free point being representative of the sufficient sub-portion of the media content program.

23. An apparatus comprising:
a communication interface configured to receive a media content program from a content delivery subsystem, the media content program including at least one commercial segment; and
at least one processor configured to
record at least a subset of a media content program,
automatically determine, while recording the media content program, that a sufficient sub-portion of the media content program has been recorded to enable initiation of commercial free playback of the media content program, and
provide, in response to the determination that the sufficient sub-portion of the media content program has been recorded, a commercial free status indicator for presentation to a user to indicate that the commercial free playback is available to the user.

24. The apparatus of claim 23, wherein said at least one processor is configured to determine the commercial free point by summing at least one duration corresponding with the at least one commercial segment and setting the commercial free point equal to the sum of the at least one duration.

25. The apparatus of claim 23, wherein said at least one processor is configured to determine the commercial free point by summing at least one duration corresponding with the at least one commercial segment and setting the commercial free point equal to the sum of the at least one duration plus a predetermined delay.

26. The apparatus of claim 23, wherein said at least one processor is configured to determine the commercial free point based on a total duration of at least a subset of the media content program.

* * * * *